United States Patent
Sheng et al.

(10) Patent No.: US 9,716,964 B1
(45) Date of Patent: Jul. 25, 2017

(54) MODIFYING OPERATION OF COMPUTING DEVICES TO MITIGATE SHORT-TERM IMPAIRED JUDGMENT

(71) Applicant: FMR LLC, Boston, MA (US)

(72) Inventors: Xinxin Sheng, Cary, NC (US); Hong Sun, Cary, NC (US); Pei Gu, Cary, NC (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 15/139,190

(22) Filed: Apr. 26, 2016

(51) Int. Cl.
*H04B 7/00* (2006.01)
*H04W 4/00* (2009.01)
*H04W 4/20* (2009.01)

(52) U.S. Cl.
CPC .......... *H04W 4/003* (2013.01); *H04W 4/008* (2013.01); *H04W 4/20* (2013.01)

(58) Field of Classification Search
CPC ........ H04W 4/003; H04W 4/008; H04W 4/20
USPC ..................... 455/41.1, 41.2, 41.3
See application file for complete search history.

(56) References Cited

U.S. PATENT DOCUMENTS

| | | | |
|---|---|---|---|
| 8,396,452 B1 | 3/2013 | Matsuoka | |
| 8,625,796 B1 | 1/2014 | Ben Ayed | |
| 8,715,178 B2* | 5/2014 | Price | A61B 5/01 434/156 |
| 2003/0204526 A1* | 10/2003 | Salehi-Had | G06F 21/35 |
| 2006/0136741 A1 | 6/2006 | Mercredi | |
| 2007/0004381 A1 | 1/2007 | Larson et al. | |
| 2007/0194882 A1 | 8/2007 | Yokota et al. | |
| 2008/0183388 A1* | 7/2008 | Goodrich | A61B 5/14546 701/300 |
| 2010/0274859 A1* | 10/2010 | Bucuk | H04L 63/08 709/206 |
| 2010/0328073 A1* | 12/2010 | Nikitin | G01S 5/0247 340/572.1 |
| 2011/0241838 A1 | 10/2011 | Wischmeyer | |
| 2011/0321118 A1 | 12/2011 | Boldyrev et al. | |
| 2012/0055726 A1* | 3/2012 | Hannon | H04K 3/415 180/272 |

(Continued)

FOREIGN PATENT DOCUMENTS

| | | |
|---|---|---|
| WO | 2009138955 A2 | 11/2009 |
| WO | 2015067942 A1 | 5/2015 |

OTHER PUBLICATIONS

"Imprivata OneSign Secure Walk-Away," retrieved from www.imprivata.com, 2015, 2 pages.

(Continued)

*Primary Examiner* — Md Talukder
(74) *Attorney, Agent, or Firm* — Proskauer Rose LLP (57) ABSTRACT

Methods and apparatuses are described for modifying operation of computing devices to mitigate short-term impaired judgment using wearable devices. A short-range frequency reader coupled to a target device detects a wearable device in proximity to the reader, the wearable device comprising a short-range frequency antenna. The reader identifies a user wearing the wearable device. The reader receives biometric information of the user from the wearable device. The reader determines a level of operational impairment of the user by analyzing the biometric information. The reader modifies one or more operational functions of the target device based upon the level of operational impairment of the user.

25 Claims, 2 Drawing Sheets

(56) References Cited

U.S. PATENT DOCUMENTS

| | | | |
|---|---|---|---|
| 2012/0075062 A1 | 3/2012 | Osman et al. | |
| 2012/0228047 A1* | 9/2012 | White | B60K 28/063 |
| | | | 180/272 |
| 2012/0244812 A1* | 9/2012 | Rosener | H04M 1/05 |
| | | | 455/41.3 |
| 2013/0263206 A1 | 10/2013 | Nefedov et al. | |
| 2013/0291056 A1 | 10/2013 | Gaudet et al. | |
| 2014/0052567 A1* | 2/2014 | Bhardwaj | G06Q 30/0631 |
| | | | 705/26.7 |
| 2014/0096215 A1 | 4/2014 | Hessler | |
| 2014/0109243 A1 | 4/2014 | Ting et al. | |
| 2014/0123249 A1 | 5/2014 | Davis et al. | |
| 2014/0189786 A1* | 7/2014 | Castro | H04L 63/105 |
| | | | 726/1 |
| 2014/0306826 A1* | 10/2014 | Ricci | H04W 48/04 |
| | | | 340/573.1 |
| 2014/0309806 A1* | 10/2014 | Ricci | B60Q 1/00 |
| | | | 701/1 |
| 2016/0029145 A1* | 1/2016 | Angiolillo | H04W 4/001 |
| | | | 455/418 |
| 2016/0036964 A1* | 2/2016 | Barfield, Jr. | H04W 4/02 |
| | | | 455/418 |
| 2016/0093154 A1* | 3/2016 | Bytnar | G07F 17/3218 |
| | | | 463/25 |

OTHER PUBLICATIONS

"Xyloc Full-Time Workstation Security," retrieved from http://www.ensuretech.com/wp-content/uploads/2011/08/xyloc-overview-brochure.pdf,2009, 4 pages.

Notice of Allowance in related U.S. Appl. No. 14/931,634, dated Mar. 30, 2016, 14 pages.

* cited by examiner

MODIFYING OPERATION OF COMPUTING DEVICES TO MITIGATE SHORT-TERM IMPAIRED JUDGMENT

TECHNICAL FIELD

This application relates generally to methods and apparatuses, including computer program products, for modifying operation of computing devices to mitigate short-term impaired judgment using wearable devices.

BACKGROUND

With the advent of computer-based technology, wearable devices have become commonplace. Items such as watches, eyeglasses, and even clothing have been augmented to include technology such as a processor, memory, and a network interface that enables the items to collect and process data and to transmit the data over a communication network to a back-end system, which in turn can analyze the data collected by the wearable devices in a variety of ways. Due to their nature, certain types of wearable devices are especially well-equipped to collect biometric information about the user who is wearing them and atmospheric information about the environment surrounding the user. For example, smart watches may include circuitry to monitor the user's pulse and can record this information for future analysis.

In addition, it is not uncommon for people to have impaired judgment that may be caused by any number of physical or emotional factors, such as anger, alcohol, drugs, or medical emergencies. While judgment is impaired, the human body often exhibits certain physical or emotional conditions and these conditions may lead to undesirable or dangerous actions, such as operation of a vehicle or sending an ill-advised email.

SUMMARY

Therefore, what is needed are methods and systems for using wearable devices to capture relevant biometric information of the users wearing the devices in order to change the operation of computing devices for mitigating short-term impaired judgment of the users. As described herein, wearable devices measure and track certain physical indicators of the wearers, and depending on the severity and nature of the impaired judgment, the wearable devices can transmit instructions to other computing devices and systems to automatically change the operation of such devices and systems so that potentially improper or dangerous behavior is prevented, restricted, or warned against.

The invention, in one aspect, features a method for modifying operation of computing devices to mitigate short-term impaired judgment using wearable devices. A short-range frequency reader coupled to a target device detects a wearable device in proximity to the reader, the wearable device comprising a short-range frequency antenna. The reader identifies a user wearing the wearable device. The reader receives biometric information of the user from the wearable device. The reader determines a level of operational impairment of the user by analyzing the biometric information. The reader modifies one or more operational functions of the target device based upon the level of operational impairment of the user.

The invention, in another aspect, features a system for modifying operation of computing devices to mitigate short-term impaired judgment using wearable devices. The system includes a short-range frequency reader coupled to a target device and a wearable device comprising a short-range frequency antenna. The reader detects a wearable device in proximity to the reader. The reader identifies a user wearing the wearable device. The reader receives biometric information of the user from the wearable device. The reader determines a level of operational impairment of the user by analyzing the biometric information. The reader modifies one or more operational functions of the target device based upon the level of operational impairment of the user.

The invention, in another aspect, features a computer program product, tangibly embodied in a non-transitory computer readable storage device, for modifying operation of computing devices to mitigate short-term impaired judgment using wearable devices. The computer program product includes instructions operable to cause a short-range frequency reader coupled to a target device to detect a wearable device in proximity to the reader, the wearable device including a short-range frequency antenna. The computer program product includes instructions operable to cause the reader to identify a user wearing the wearable device. The computer program product includes instructions operable to cause the reader to receive biometric information of the user from the wearable device. The computer program product includes instructions operable to cause the reader to determine a level of operational impairment of the user by analyzing the biometric information. The computer program product includes instructions operable to cause the reader to modify one or more operational functions of the target device based upon the level of operational impairment of the user.

Any of the above aspects can include one or more of the following features. In some embodiments, identifying a user wearing the wearable device comprises receiving, from the wearable device, a unique identifier stored in memory of the wearable device; retrieving, by the reader, a user profile that corresponds to the unique identifier from a server computing device; and identifying, by the reader, the user based upon the user profile. In some embodiments, the reader determines a distance of the wearable device from the reader and an orientation of the wearable device in relation to the reader, and modifies one or more of the operational functions of the target device based upon the distance of the wearable device from the reader and the orientation of the wearable device in relation to the reader.

In some embodiments, modifying the operational functions of the target device includes enabling access to the target device. In some embodiments, modifying the operational functions of the target device includes disabling access to the target device. In some embodiments, modifying the operational functions of the target device includes restricting operation of the target device. In some embodiments, restricting operation of the target device comprises disabling a first portion of functionality of the target device while maintaining a second portion of functionality of the target device.

In some embodiments, the reader issues a notification to a mobile device based upon the level of operational impairment determined by the reader. In some embodiments, the mobile device is associated with a person other than the user. In some embodiments, the notification includes a warning regarding the level of operational impairment of the user. In some embodiments, the notification includes a suggestion regarding mitigation of the level of operational impairment of the user.

In some embodiments, the biometric information includes a heart rate of the user, a blood pressure reading of the user, a blood sugar reading of the user, a body temperature of the user, a voice volume of the user, a speech pattern of the user, or any combination thereof. In some embodiments, the wearable device collects the biometric information and transmits the biometric information to the reader. In some embodiments, the reader analyzes the biometric information to determine if a characteristic of the biometric information exceeds an impairment threshold, and determines the level of operational impairment based upon an amount by which the characteristic exceeds the impairment threshold.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
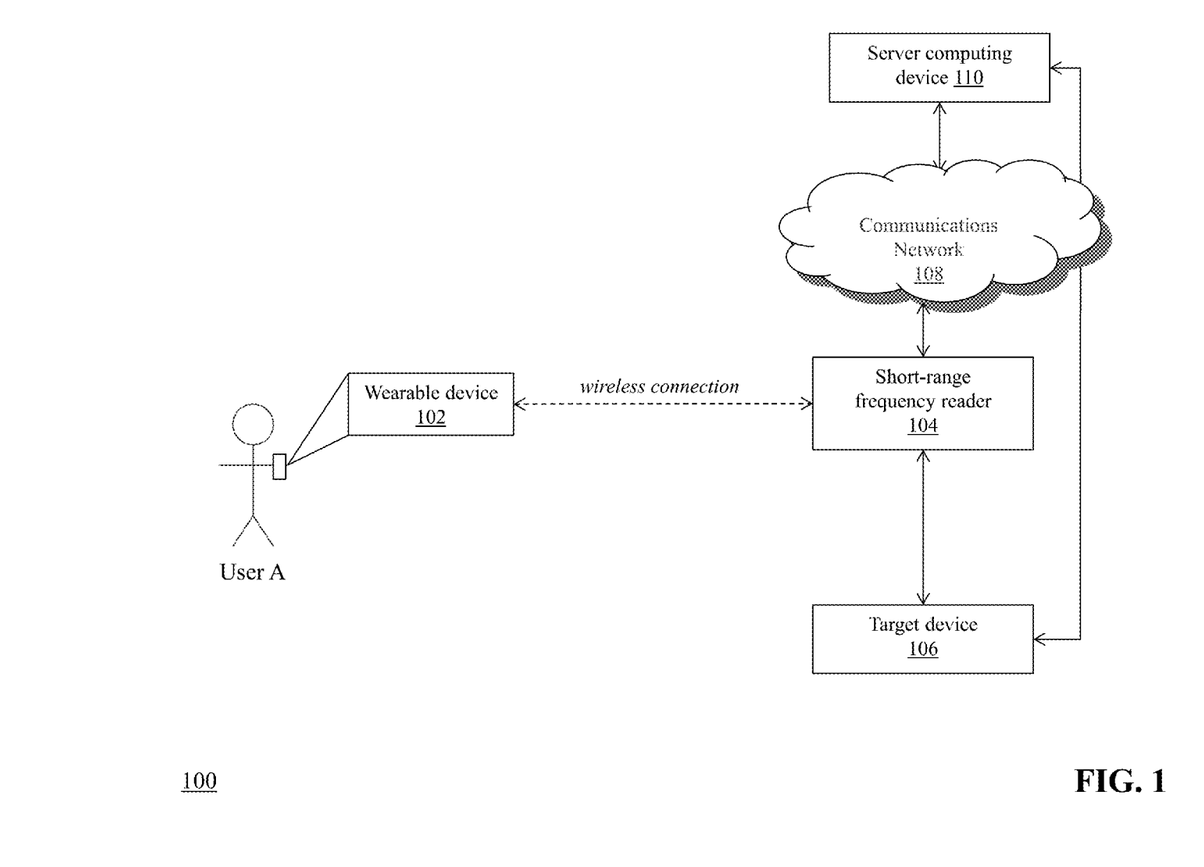
FIG. 1 is a block diagram of a system for modifying operation of computing devices to mitigate short-term impaired judgment using wearable devices.

FIG. 1 is a block diagram of a system 100 for modifying operation of computing devices to mitigate short-term impaired judgment using wearable devices. The system 100 includes a wearable device 102 (e.g., worn by User A) that is connected to a short-range frequency reader 104 coupled to a target device 106. In some embodiments, the short-range frequency reader 104 and the target device 106 are a single device, with the reader 104 being embedded as a component of the target device 106. In some embodiments, the short-range frequency reader 104 and/or the target device 106 are connected to a server computing device 110 via a communications network 108.

The wearable device 102 is preferably a small electronic device that can be worn by a user (e.g., a wristband) or affixed to the user (e.g., a clip attached to the user's clothing or secured to the user's skin). The wearable device 102 generally includes circuitry such as a processor or chip, wiring, and related hardware (e.g., transceiver, antenna) that provide the capability of communicating wirelessly with the reader 104 via a short-range communication protocol and/or frequency. Exemplary wearable devices can include, but are not limited to, fabrics with integrated wiring and sensors; medical devices for in-hospital or outpatient use such as heart-rate monitors, blood pressure monitors, blood sugar sensors and the like; radio-frequency identification (RFID) or near-field communication (NFC) wristbands; smart watches and fitness bands that keep track of the user's vital signs; Bluetooth headsets or earpieces; smart glasses such as Google® Glass; electronic jewelry having short-range communication capabilities; blood alcohol detectors; and clothing with embedded light-emitting diodes (LEDs) to display custom messages or artwork.

The short-range frequency reader 104 is preferably a small computing device equipped with a processor, memory, and communication hardware (such as an antenna, transceiver, and the like) that is capable of communicating with the wearable device 102 via short-range communication protocol and/or frequency. Exemplary readers 104 can include but are not limited to mobile devices, smartphones, tablets, laptop computers, RFID/NFC readers, and the like. The reader 104 can communicate with the wearable device 102 via a number of different short-range communication protocols and/or frequencies, such as Bluetooth, RFID, NFC, magnetic fields, or WiFi. The reader 104 is capable of transmitting a signal to the wearable device 102 and receiving a signal from the device 102, and further determining a distance of the wearable device from the reader 104 and an orientation of the wearable device relative to the reader 104 based upon the exchange of signals between the reader and the device.

The target device 106 is an electronic device coupled to the short-range frequency reader 104, for which certain functionality of the target device 106 is enabled, modified, or disabled based upon characteristics of the user wearing the wearable device 102, as detected by the wearable device 102. As will be described in greater detail below, the characteristics can include biometrics and physical attributes of the user (e.g., heart rate, body temperature, speech patterns/volume, blood alcohol content, blood sugar, blood pressure), relative location of the user (e.g., distance of the wearable device 102 from the short-range frequency reader 104 and/or the orientation of the wearable device 102 in relation to the target device 106), and the like. The target device 106 can be any type of electronic device with functionality or capabilities that can be managed or controlled. Exemplary target devices 106 include, but are not limited to, computing devices (e.g., laptops, tablets, smartphones, video game consoles, set top boxes, routers, WiFi hotspots); audio/visual devices (e.g., televisions, radios); appliances; electronic locks (e.g., doors, cabinets); lighting; mechanical devices with embedded control devices such as processor, a control board and optional wireless communication capability (e.g., an automobile); and the like.

The communications network 108 enables the short-range frequency reader 104 and/or the target device 106 to communicate with the server computing device 110—for example, if the server computing device 110 is in a different location than the short-range frequency reader 104. The network 108 may be a local network, such as a LAN, or a wide area network, such as the Internet and/or a cellular network. In some embodiments, the network 108 is comprised of several discrete networks and/or sub-networks (e.g., cellular to Internet) that enable the short-range frequency reader 104 and/or the target device 106 to communicate with the server computing device 106.

The server computing device 110 is a combination of hardware and software modules that provide resources and functionality to the short-range frequency reader 104 and/or the target device 106 as described herein. The server computing device 110 can include specialized hardware and/or software modules that execute on a processor and interact with memory modules of the server computing device 106, to perform functions associated with the system 100 for control of and/or communication with the target device 106 based upon information collected by the wearable device 102, as described herein. For example, the server computing device 110 can communicate with the short-range frequency reader 104 to authenticate a wearable device 102 detected by the short-range frequency reader 104 and identify a user associated with the device 102. In another example, the server computing device 110 can communicate with the target device 106 to enable, modify, disable (or otherwise control) functionality of the target device 106—including access control to the target device 106—based upon, e.g., information provided by the short-range frequency reader 104 via the wearable device 102.

Figure 2:
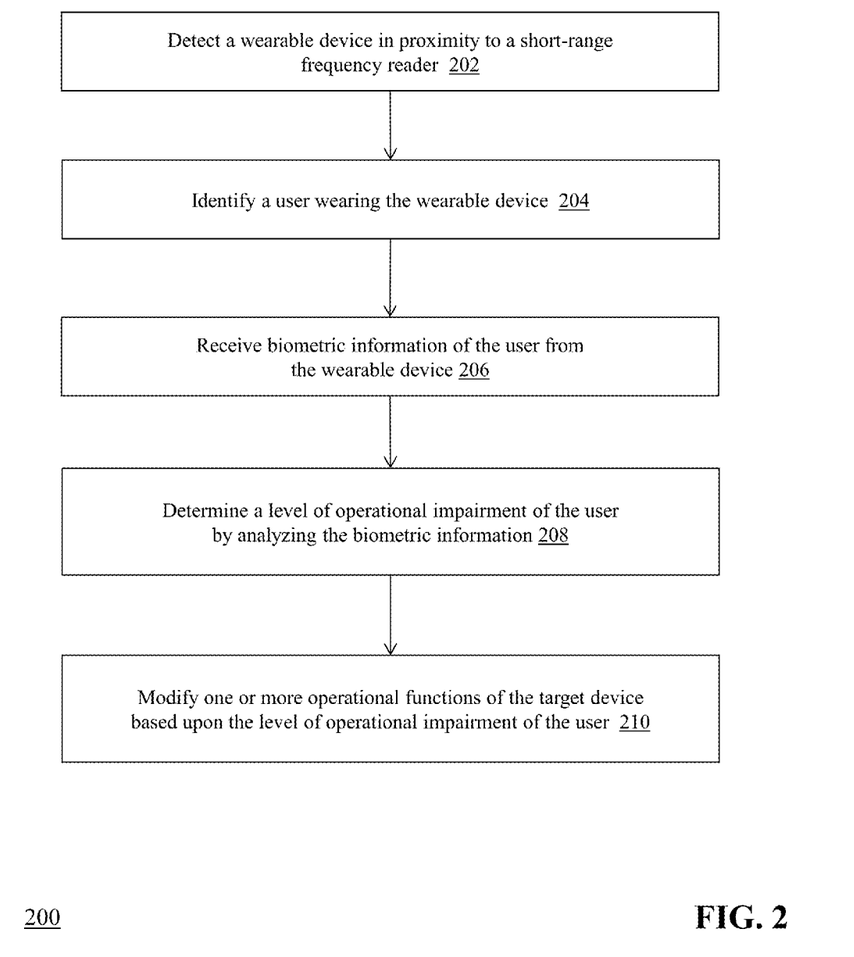
FIG. 2 is a flow diagram of a method for modifying operation of computing devices to mitigate short-term impaired judgment using wearable devices.

FIG. 2 is a flow diagram of a method 200 for modifying operation of computing devices to mitigate short-term impaired judgment using wearable devices, using the system 100 of FIG. 1. The short-range frequency reader 104 detects (202) a wearable device 102 in proximity to the reader 104, which is coupled to a target device 106 that a user would like to control, operate functionality of, and/or gain access to. As described above, the wearable device 102 includes a short-range frequency antenna that is capable of communicating with the reader 104 when the wearable device 102 enters the operable range of the reader 104. Also, in this embodiment, the wearable device 102 is associated with a specific user that is wearing the device. For example, wearable device 102 can be a smartwatch that is associated with User A. When the user approaches the reader 104, the wearable device 102 is interrogated by the reader 104 via wireless signal (e.g., RF, Bluetooth, NFC) and establishes a connection to the reader 104. It should be appreciated that a user can wear multiple wearable devices, each of which is associated with the specific user. In one example, the reader 104 can be integrated into the computing system of a motor vehicle (i.e., the target device 106) and when a user with a wearable device 102 enters the vehicle, the reader 104 detects the wearable device 102.

The reader 104 identifies (204) a user wearing the wearable device 102. Upon establishing a connection with the wearable device 102, the reader 104 can request information from the wearable device 102 in order to identify (i) the device and (ii) a user associated with the device. In one embodiment, the device 102 can provide a device identifier (e.g., MAC address, UUID, serial number, and the like) to the reader 104, and the reader 104 can connect to the server computing device 110 and request information about the device and/or a user associated with the device by using the device identifier (e.g., a database lookup). For example, the user can establish a user profile at the server computing device 110 that contains various information that is relevant to the operation of the system 100, including but not limited to demographics (such as user's name, gender, date of birth, age, role/relationship to others (e.g., parent, child, employee)), authentication parameters (e.g., username, password), and technical attributes of the wearable device. Although a user profile is described here, it should be appreciated that there are other ways to identify a user based upon certain attributes of a wearable device.

Upon identifying the user associated with the device 102, the reader 104 receives (206) biometric information of the user from the wearable device 102. The wearable device 102 can be configured with circuitry, components (e.g., sensors, microphones, etc.), and software to detect one or more characteristics of the user, such as heart rate, blood pressure, body temperature, blood sugar, blood alcohol level (e.g., via breath), voice (e.g., volume, tone, frequency, speech pattern), and other types of physical attributes of the user. In some cases, the wearable device 102 includes a memory module to store the detected biometric information locally. The wearable device 102 then transmits the detected biometrics to the reader 104 for analysis. In some embodiments, the reader 104 can pass the biometrics to the server computing device 110 via the network 108 and the devices 104, 110 can analyze the biometric information separately or in conjunction with each other.

The reader 104 (and/or the server computing device 110) determines (208) a level of operational impairment of the user by analyzing the biometric information received from the wearable device 102. In one example, the reader 104 can determine that, based upon a sample of the user's breath collected by the wearable device 102, the user's blood alcohol content exceeds a prescribed threshold—indicating that the user is intoxicated. Based upon this information, the reader 104 determines that the user should be prevented from operating a motor vehicle while in this condition.

The reader 104 then modifies (210) one or more operational functions of the target device 106 based upon the level of operational impairment of the user. Continuing with the above example, upon determining that the user should be prevented from operating a motor vehicle, the reader 104 sends instructions to the computing system installed in the motor vehicle to, e.g., disable the ignition switch to prevent the vehicle's engine from starting.

In some embodiments, the reader 104 can further communicate with the server computing device 110 to, e.g., determine which operational function(s) of the target device 106 should be modified and/or take additional actions in view of the level of operation impairment of the user. For example, the server computing device 110 can transmit a notification to, e.g., a mobile device of an emergency contact of the user (as configured in the user profile described above) that the user appears to be intoxicated and has entered the vehicle. The server computing device 110 can establish a call between the emergency contact and the user so that the emergency contact can check on the well-being of the user and provide further assistance.

In some embodiments, the reader 104 can determine a distance of the wearable device 102 from the reader 104 and an orientation of the wearable device 102 in relation to the target device 106. For example, the reader 104 can identify that wearable device 102 is associated with an owner of the vehicle and determine that the wearable device 102 is located in the driver's seat of the vehicle. In this instance, if the reader 104 determines that the user is intoxicated, the reader 104 can disable operation of the vehicle as described above. However, the reader 104 may determine that the wearable device 102 is located in a passenger seat—indicating that the user is not in a position to operate the vehicle. In this instance, the reader 104 can forgo the transmission of instructions to the computing system of the vehicle to disable operation.

In some embodiments, the reader 104 can be configured to detect if the wearable device 102 is in proximity to the reader 104 but is not currently being worn by a user. For example, a wearable device 102 can be configured to detect and monitor a user's pulse. If the reader 104 receives an indication from the wearable device 102 that no pulse is detected, the reader 104 can issue instructions to the vehicle's computing system to disable operation of the vehicle until the wearable device 102 is once again detecting the user's pulse (and is also detecting other conditions, such as blood alcohol level).

It should be appreciated that the modification of operational functions can include other types of actions based upon the biometric information collected by the wearable device 102—such as enabling or disabling access to the target device 106 (e.g., to a computing system, to a physical location via an electronic door lock) and restricting certain functionality of the target device 106 (e.g., specific hardware or software functions) without preventing the user from using the target device 106 altogether. For example, the target device 106 can be a user's desktop computer. If the reader 104 receives information from the wearable device 102 that indicates the user has an elevated heart rate and/or blood pressure, the reader 104 can determine that the user is experiencing a physical medical condition, an altered emotional state (e.g., angry) or is under a high level of stress. In this example, the reader 104 can be configured to prevent access to certain functionality of the desktop computer when the user is experiencing this condition—such as disabling network connectivity or preventing an email application on the desktop computer from sending emails, e.g., in order to prevent the user from sending an ill-advised communication that he or she may regret later. The user may still be permitted to draft emails and use other functions of the computer, but the network connectivity/email sending capability can be restricted until the reader 104 determines, from the wearable device 102, that the user's heart rate/blood pressure has returned to a normal level.

It should be appreciated that the wearable device 102 and reader 104 (and/or server computing device 110) can be configured to periodically collect and analyze the biometric information of the user, in order to provide dynamic modification of the functions of the target device 106. As mentioned above, the system 100 can automatically adjust the functionality/operation of the target device 106 based upon the continuous monitoring of the user's biometric information. The user's condition can constantly be monitored through the wearable device 102 and therefore the system 100 can provide real-time or near real-time evaluation of the condition and modification of the target device 106 as appropriate.

It should further be appreciated that the system 100 can aggregate biometrics and other data from multiple wearable devices 102 of a particular user, and utilize pre-defined rules to determine whether to modify functions of the target device 106. In this type of system, a central module (e.g., installed at the server computing device 110) receives information from the plurality of different wearable devices associated with the user. Using the above example, the wearable devices of the user may detect both that the user has a high heart rate and that he or she is yelling. The reader 104 can analyze this information to determine that the user is angry. As a result, the reader 104 can modify the operation of the target device 106 until the detected conditions have changed to indicate the user is no longer angry.

The system 100 can also keep records (e.g., in a database) of a user's history in order to provide a baseline from which the module can determine the level of operational impairment. For example, a user's heart rate may be elevated as a normal physical condition when compared to other people, and it does not necessarily indicate a change in emotional state or stress level. The system 100 can determine that the heart rate threshold for this particular user is within an acceptable range based upon the user's history profile and as a result, the system 100 does not modify the operation of the target device 106. In other instances, the system 100 can determine the baseline from aggregated values across one or more user groups based upon, e.g., age, gender, occupation, geographic location, and so forth.

As mentioned above, the system 100 can incorporate a multitude of actions in response to determining that a user is experiencing a level of operational impairment. In some cases, these actions are intended to mitigate potentially undesirable or harmful results from the user's actions while impaired. The actions can be allocated into three categories: mandatory, optional, and suggestive.

Mandatory actions are often consequences of impaired judgments that are enforced by law, business, community, or organization regulations. For instance as mentioned above, in most if not all jurisdictions, it is illegal to drive a car while under the influence of alcohol or other drugs. To mitigate this type of impaired judgment, the wearable device 102 can be a blood alcohol content (BAC) detector that detects a user's BAC level via breath monitoring. As such, the system 100 can be configured with actions that restrict the user from operating a motor vehicle (e.g., by instructing the vehicle computer to disable ignition) until his or her BAC level has returned to an acceptable level. In another example, the FMCSA (Federal Motor Carrier Safety Administration) has published Hours of Service regulations to limit a truck driver's driving hours. The wearable device 102 can track the number of hours that a driver has spent behind the wheel and using this information, the system 100 can issue warnings to the driver's (or his supervisor's) mobile device that the driver must take a break. In some cases, the reader 104/server computing device 110 can notify the truck's computing system of the condition and modify the operation of the truck's computing system to make the driver pull over and take a break.

In another example, most jurisdictions have laws regarding preventing operation of a childcare or daycare facility (or rescinding a license to operate such a facility) based upon drug impairment or use. In this instance, the system 100 can be configured such that a wearable device 102 detects intoxication or impairment of an employee attempting to enter a daycare facility. The reader 104 (or server computing device 110) can automatically instruct the security system of the facility to prevent the user from gaining access to the facility (e.g., by disabling the user's badge or by locking entry doors) while the user is under the influence.

The system 100 can also be configured to take optional actions in response to detecting operational impairment of a user, but unlike mandatory actions, the optional actions can be cancelled or overriden by the user. For example, the system 100 may include a user profile for a person with prior anger management issues. The user profile can include rules that are triggered if the user's wearable device 102 provides information to the reader 104 that indicates he is angry. Such rules can include, but are not limited to, the following items:

Instruct the user's computing system to prevent transmission of emails or text messages, and hold any drafted messages for two hours. Then, instruct the computing system to send the messages back to the user for review and confirmation if the user still wishes to send them.

If the user is operating an online brokerage or financial trading application, instruct the user's computing system (or the specific application) to display a warning message when the user attempts to execute a trade and request that the user manually confirm the transaction before executing it.

Prevent any functionality in the user's computer system that would result in erasure of data, destruction of equipment, large-scale transactions, or other types of potentially damaging actions.

Another type of optional action involves situations where the user is experiencing a medical emergency. In these cases, the system 100 can be configured to automatically contact other computing device in order to seek help for the user. For example, if the wearable device 102 detects that the user's pulse is very weak and reader 104 determine that the user is having a heart attack, the reader 104 can automatically transmit instructions, e.g., to the server computing device 110 or the mobile phone of the user to:

Contact emergency personnel (e.g., call 9-1-1).
Call family or emergency contacts.

Trigger an audible alarm of the wearable device 102 or another device to alert bystanders.

Suggestive actions can include situations when short-term impaired judgment is detected, and to help the user recover from this condition. For instance, the wearable device 102 can collect information about a user's sleep habits and the reader 104 can detect that the user is not sleeping well—potentially impairing the user's judgment or awareness. The reader 104 can retrieve information from a relevant database and transmit instructions to the user's mobile device to provide a message with diet suggestions to help the user to recover more quickly. In another example, a user may be taking certain prescription drugs that can cause impairment with respect to specific tasks (e.g., operating a vehicle or machinery, participating in strenuous exercise, lifting heavy objects) or the drugs may have harmful effects if taken in combination with certain other drugs. As a result, the system 100 can analyze the user's medical history and prescription information, in addition to or in conjunction with certain vital signs recorded by the wearable device 102, to provide a message to the user with a warning to avoid certain behaviors or activities while taking said medication.

As can be appreciated, wearable devices 102 are continuing to evolve, and many now have the ability to perform functions associated with analyzing the biometric information, storing and outputting the results of the analysis. In some embodiments, the wearable device 102 can perform the analysis of the biometrics as described above and transmit the results to the reader 104 (or server computing device 110) to modify operation of the target device 106.

Also, as mentioned previously, the system 100 can be configured with rules that determine a set of action(s) to be taken if the level of operational impairment of the user is detected. Rules can be associated with a corresponding action category, defined as $$R_{cat} = \{r_1, r_2, \ldots, r_m\}$$

where $R_{cat} \in$ {mandatory action, optional action, suggestive action} but not limited in the described set, r is the individual rule and m indicates the number of rules applied in the current category.

The system 100 can either pre-load a set of decision rules to the wearable device 102 and/or the reader 104 (e.g., as a manufacture recommendation), or the rules can be customized and defined by individuals or groups (e.g. corporate policy). In some embodiments, one rule can be triggered by different wearable devices, and one wearable device can trigger different rules in different rule categories as well. For example, one rule can trigger a mandatory action or an optional action or a suggestion, or any combination of two, or even all three. Rules can also be updated according to applicability or dynamically in real-time.

For example, if a person turns age twenty-one today, he is allowed to consume alcohol legally. The system 100 can be configured with a rule that automatically dials his parent's mobile device if the user is underage and the wearable device 102 detects alcohol on his breath (or if the wearable device 102 determines that the user's geolocation based upon a GPS reading is inside of a bar). The system 100 monitors the user's birth date and age, and automatically updates the above rule for the user when he turns twenty-one so that the wearable device 102 no longer dials his parent's phone number if the wearable device 102 detects alcohol. The user does not need to take any action in order to update the applicability of the rule; the system 100 automatically configures the ruleset based upon its understanding of the user and his profile.

In another example, certain states ban handheld cell phone use while driving. So if a user is driving through several states, making a handheld phone call can be legal in one state but illegal after passing the state line. Therefore, the rule is not applicable to a previous GPS location, but becomes applicable in a new GPS location. The wearable device 102 can automatically transmits GPS coordinates to the reader 104/server computing device 110 and when the user crosses into a state where handheld cellphone use is illegal, the reader 104/server 110 can transmit operational commands to the user's cell phone to display a warning message when approaching the state line, or in some instances, if the user is currently on the phone when crossing, the reader 104 can instruct the cell phone to end the call and disable calling features. In a further embodiment, the reader 104 can receive information from the computer embedded in the car regarding the user's speed, ignition state, engine operation, etc. and can re-enable calling features on the cell phone if the car's speed is zero or if the engine is off—indicating that the user is no longer operating the vehicle and it is safe to allow phone calls.

As mentioned above, the wearable device 102 can be configured to continually stream biometric information to the reader 104/server computing device 110. The reader 104 or server 110 receives the biometric information and generates a normal distribution from the information. The system 100 can prune outliers to establish a usable data model. For example, median values and 95% confidence intervals can be calculated from the normal distribution for each wearable device input stream. The system can analyze the next input stream received from the wearable device 102 during a sliding time window and validate the input stream against the normal distribution.

The system 100 can use history data to calibrate the measured value against the "normal value." As described above, the 'normal' values (e.g., for certain types of health indicators) can vary from one person to the next. Therefore, in some cases it is important to set up baselines for individuals in order to ensure that the conditions detected by the wearable device 102 indicate impaired judgment.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A method for modifying operation of computing devices to mitigate short-term impaired judgment using wearable devices, the method comprising:
   detecting, by a short-range frequency reader coupled to a target device, a wearable device in proximity to the reader, the wearable device comprising a short-range frequency antenna;
   identifying, by the reader, a user wearing the wearable device;
   receiving, by the reader, current biometric information of the user from the wearable device;

determining, by the reader, a current emotional state of the user based upon the current biometric information, including comparing the current biometric information to baseline biometric information of the user previously collected by the wearable device, wherein the baseline biometric information is indicative of a non-impaired emotional state of the user;

determining, by the reader, a level of operational impairment of the user by analyzing the current emotional state of the user;

selecting, by the reader, one or more rules corresponding to a combination of the wearable device, the target device, and the level of operational impairment of the user;

identifying, by the reader, a plurality of actions associated with the selected one or more rules, including at least one mandatory action, at least one optional action, and at least one suggestive action; and executing, by the reader, the identified plurality of actions to modify one or more operational functions of the target device and to issue a notification relating to the level of operational impairment to a remote device.

2. The method of claim 1, wherein identifying a user wearing the wearable device comprises receiving, from the wearable device, a unique identifier stored in memory of the wearable device;

retrieving, by the reader, a user profile that corresponds to the unique identifier from a server computing device; and identifying, by the reader, the user based upon the user profile.

3. The method of claim 1, further comprising determining, by the reader, a distance of the wearable device from the reader and an orientation of the wearable device in relation to the reader; and modifying, by the reader, one or more of the operational functions of the target device based upon the distance of the wearable device from the reader and the orientation of the wearable device in relation to the reader.

4. The method of claim 1, wherein modifying the operational functions of the target device includes enabling access to the target device.

5. The method of claim 1, wherein modifying the operational functions of the target device includes disabling access to the target device.

6. The method of claim 1, wherein modifying the operational functions of the target device includes restricting operation of the target device.

7. The method of claim 6, wherein restricting operation of the target device comprises disabling a first portion of functionality of the target device while maintaining a second portion of functionality of the target device.

8. The method of claim 1, wherein the remote device is associated with a person other than the user.

9. The method of claim 1, wherein the notification includes a warning regarding the level of operational impairment of the user.

10. The method of claim 1, wherein the notification includes a suggestion regarding mitigation of the level of operational impairment of the user.

11. The method of claim 1, wherein the current biometric information includes a heart rate of the user, a blood pressure reading of the user, a blood sugar reading of the user, a body temperature of the user, a voice volume of the user, and a speech pattern of the user.

12. The method of claim 1, wherein the wearable device collects the current biometric information and transmits the current biometric information to the reader.

13. A system for modifying operation of computing devices to mitigate short-term impaired judgment using wearable devices, the system comprising a short-range frequency reader coupled to a target device, the reader configured to:

detect a wearable device in proximity to the reader, the wearable device comprising a short-range frequency antenna;

identify a user wearing the wearable device;

receive current biometric information of the user from the wearable device;

determine a current emotional state of the user based upon the current biometric information, including comparing the current biometric information to baseline biometric information of the user previously collected by the wearable device, wherein the baseline biometric information is indicative of a non-impaired emotional state of the user;

determine a level of operational impairment of the user by analyzing the current emotional state of the user;

select one or more rules corresponding to a combination of the wearable device, the target device, and the level of operational impairment of the user;

identify a plurality of actions associated with the selected one or more rules, including at least one mandatory action, at least one optional action, and at least one suggestive action; and execute the identified plurality of actions to modify one or more operational functions of the target device and to issue a notification relating to the level of operational impairment to a remote device.

14. The system of claim 13, wherein the reader is configured to identify a user wearing the wearable device by receiving, from the wearable device, a unique identifier stored in memory of the wearable device;

retrieving a user profile that corresponds to the unique identifier from a server computing device; and identifying the user based upon the user profile.

15. The system of claim 13, wherein the reader is further configured to determine a distance of the wearable device from the reader and an orientation of the wearable device in relation to the reader; and modify one or more of the operational functions of the target device based upon the distance of the wearable device from the reader and the orientation of the wearable device in relation to the reader.

16. The system of claim 13, wherein the reader is configured to modify the operational functions of the target device by enabling access to the target device.

17. The system of claim 13, wherein the reader is configured to modify the operational functions of the target device by disabling access to the target device.

18. The system of claim 13, wherein the reader is configured to modify the operational functions of the target device by restricting operation of the target device.

19. The system of claim 18, wherein the reader restricts operation of the target device by disabling a first portion of functionality of the target device while maintaining a second portion of functionality of the target device.

20. The system of claim 13, wherein the remote device is associated with a person other than the user.

21. The system of claim 13, wherein the notification includes a warning regarding the level of operational impairment of the user.

22. The system of claim 13, wherein the notification includes a suggestion regarding mitigation of the level of operational impairment of the user.

23. The system of claim 13, wherein the current biometric information includes a heart rate of the user, a blood pressure reading of the user, a blood sugar reading of the user, a body temperature of the user, a voice volume of the user, and a speech pattern of the user.

24. The system of claim 13, wherein the wearable device collects the current biometric information and transmits the current biometric information to the reader.

25. A computer program product, tangibly embodied in a non-transitory computer readable storage device, for modifying operation of computing devices to mitigate short-term impaired judgment using wearable devices, the computer program product including instructions operable to cause a short-range frequency reader coupled to a target device to:
   detect a wearable device in proximity to the reader, the wearable device comprising a short-range frequency antenna;
   identify a user wearing the wearable device;
   receive current biometric information of the user from the wearable device;
   determine a current emotional state of the user based upon the current biometric information, including comparing the current biometric information to baseline biometric information of the user previously collected by the wearable device, wherein the baseline biometric information is indicative of a non-impaired emotional state of the user;
   determine a level of operational impairment of the user by analyzing the current emotional state of the user;
   select one or more rules corresponding to a combination of the wearable device, the target device, and the level of operational impairment of the user;
   identify a plurality of actions associated with the selected one or more rules, including at least one mandatory action, at least one optional action, and at least one suggestive action; and
   execute the identified plurality of actions to modify one or more operational functions of the target device and to issue a notification relating to the level of operational impairment to a remote device.

* * * * *